United States Patent
Foschiano et al.

(10) Patent No.: US 7,606,229 B1
(45) Date of Patent: Oct. 20, 2009

(54) GENERIC BRIDGE PACKET TUNNELING

(75) Inventors: Marco E. Foschiano, San Jose, CA (US); Sacidhar C. Nambakkam, San Jose, CA (US); Sushilkumar K. Goyal, San Jose, CA (US); Alagu Annaamalai, Saratoga, CA (US); Shyamasundar S. Kaluve, Santa Clara, CA (US); Prabhu Seshachellam, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1070 days.

(21) Appl. No.: 10/290,906

(22) Filed: Nov. 8, 2002

(51) Int. Cl.
*H04L 12/56* (2006.01)

(52) U.S. Cl. .................................................. 370/392
(58) Field of Classification Search ................ None
See application file for complete search history.

(56) References Cited

U.S. PATENT DOCUMENTS

| | | | |
|---|---|---|---|
| 6,269,404 B1 * | 7/2001 | Hart et al. .................. 709/238 |
| 6,765,881 B1 * | 7/2004 | Rajakarunanayake ....... 370/389 |
| 6,937,576 B1 * | 8/2005 | Di Benedetto et al. ...... 370/256 |
| 6,982,978 B1 * | 1/2006 | Zhang et al. ................ 370/392 |
| 7,127,523 B2 * | 10/2006 | Kotser ..................... 370/395.1 |
| 7,180,899 B2 * | 2/2007 | De Silva et al. ......... 370/395.31 |
| 7,215,667 B1 * | 5/2007 | Davis ......................... 370/389 |
| 7,260,097 B2 * | 8/2007 | Casey ........................ 370/392 |
| 7,292,581 B2 * | 11/2007 | Finn ...................... 370/395.53 |
| 7,324,447 B1 * | 1/2008 | Morford ..................... 370/231 |
| 7,339,929 B2 * | 3/2008 | Zelig et al. .................. 370/390 |
| 7,340,535 B1 * | 3/2008 | Alam ........................ 370/392 |
| 7,424,019 B1 * | 9/2008 | Kopelman et al. .......... 370/392 |
| 2003/0152075 A1 * | 8/2003 | Hawthorne et al. ......... 370/389 |
| 2003/0174706 A1 * | 9/2003 | Shankar et al. ............. 370/393 |
| 2004/0017816 A1 * | 1/2004 | Ishwar et al. ........... 370/395.53 |
| 2004/0037279 A1 * | 2/2004 | Zelig et al. .................. 370/390 |
| 2006/0050719 A1 * | 3/2006 | Barr et al. .................... 370/401 |

* cited by examiner

*Primary Examiner*—Anh-Vu Ly
(74) *Attorney, Agent, or Firm*—Samuel G. Campbell, III; Campbell Stephenson, LLP

(57) ABSTRACT

A method and system for processing a packet is disclosed. The method includes identifying the packet as a generic bridge packet tunneling (GBPT) packet, and performing GBPT processing on the packet at a network node, if the packet is a GBPT packet.

86 Claims, 8 Drawing Sheets

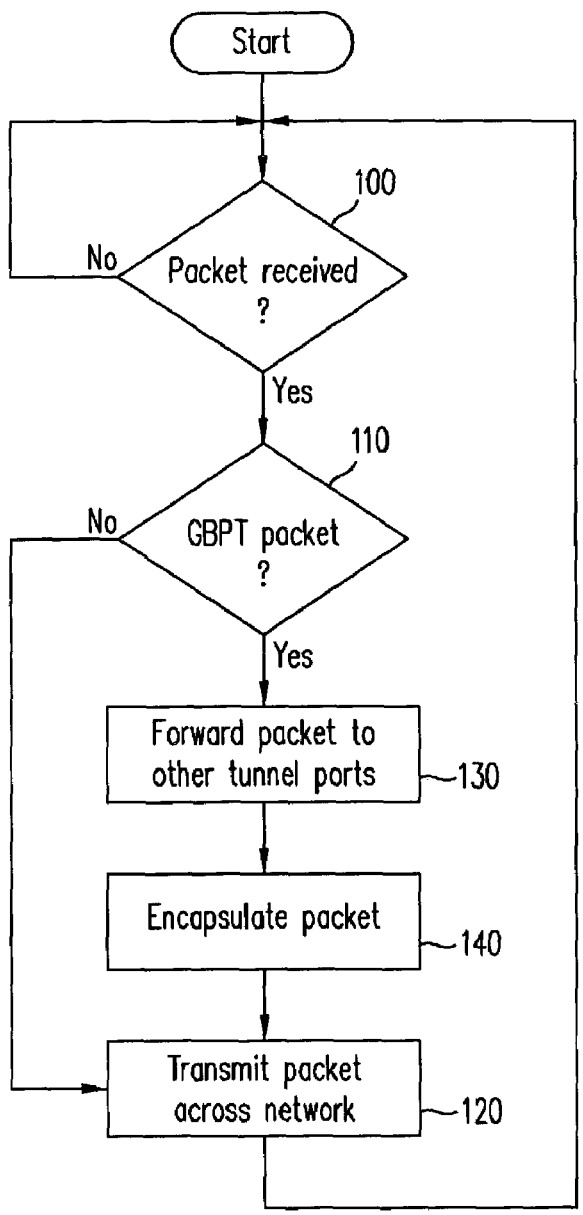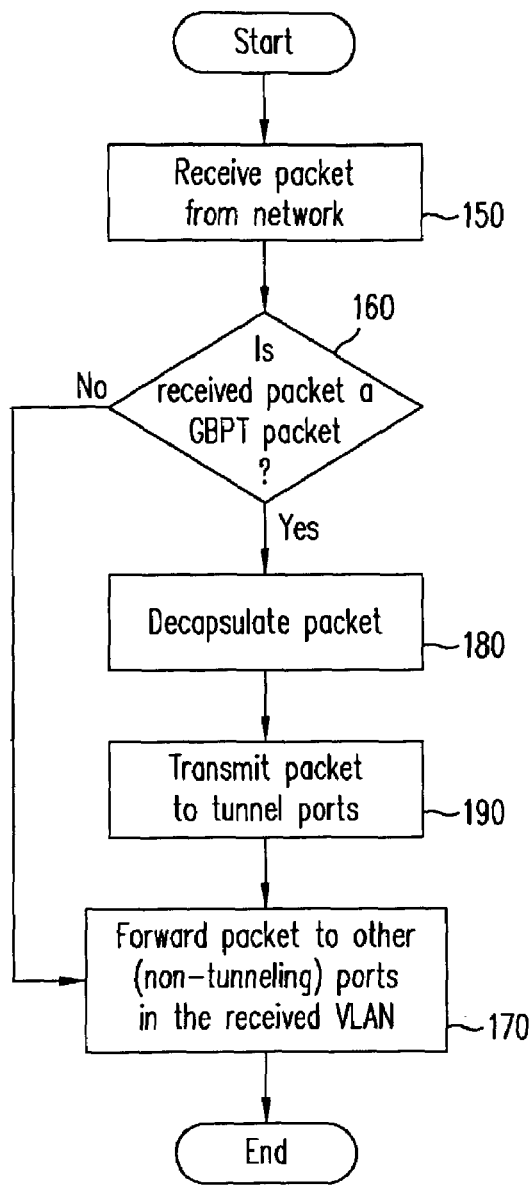
FIG. 1A
FIG. 1B

GENERIC BRIDGE PACKET TUNNELING

BACKGROUND OF THE INVENTION

1. Field of the Invention

The present invention relates to data communications, and, more particularly, to a method and apparatus for tunneling packets between network elements.

2. Description of the Related Art

In the market for metropolitan area networks, customers often utilize a service provider's virtual local area network (VLAN) to achieve transparent connectivity for an Ethernet LAN across the service provider's network. However, it has become apparent that various protocols that a customer might employ (e.g., for management of the customer's network) produce undesirable results when operated in a LAN environment in which at least a portion of the LAN is coupled to the rest of the LAN through the use of a service provider VLAN as transport vehicle.

Additionally, service providers of Ethernet LAN services, such as proprietors of transparent LAN services (TLS) networks, desire the ability to have multi-path redundancy when using 802.1Q tunneling. Moreover, such service providers desire to make the service provider network "cloud" transparent to PDUs (Protocol Data Units) such as those generated by discovery protocols (DPs, such as Cisco Systems' Cisco Discovery Protocol (CDP)) and the like, in order to improve the flexibility and manageability of the network. Current implementations of 802.1Q tunneling (certain implementations of which are referred to as QinQ, 1Q-in-1Q or tag stacking, among others) do not allow a customer switch to be dual-homed to two different service provider switches. However, such implementations do allow link redundancy between a single-homed customer switch and a service provider switch. Currently, there is also no support for tunneling PDUs of other protocols, such as discovery protocols (e.g., Cisco Discovery Protocol (CDP)) or VLAN trunking protocol (VTP), for example.

What is therefore desired is an approach that permits the tunneling of PDUs, preferably from a variety of protocols. Moreover, by using the capability of tunneling such PDUs, TLS networks could be built with redundant links to the same or different service providers. It is also desirable to allow a customer to discover its switches on the other end of the tunnel as if those switches were physically adjacent. Enterprise customers may also desire to tunnel PDUs in order to unify their sites' VLAN management across a TLS network, among other such functionality.

SUMMARY OF THE INVENTION

In one embodiment of the present invention, a method of processing a packet is disclosed. The method includes identifying the packet as a generic bridge packet tunneling (GBPT) packet, and performing GBPT processing on the packet at a network node, if the packet is a GBPT packet.

In another embodiment of the present invention, a network element is disclosed. The network element includes a forwarding engine. The forwarding engine stores a forwarding table. The forwarding engine is configured to identify a packet as a generic bridge packet tunneling (GBPT) packet using the forwarding table.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 1A is a flow diagram illustrating actions performed by a transmission process according to an embodiment of the present invention.

FIG. 1B is a flow diagram illustrating actions performed by a reception process according to an embodiment of the present invention.

The use of the same reference symbols in different drawings indicates similar or identical items.

DETAILED DESCRIPTION

Figure 2:
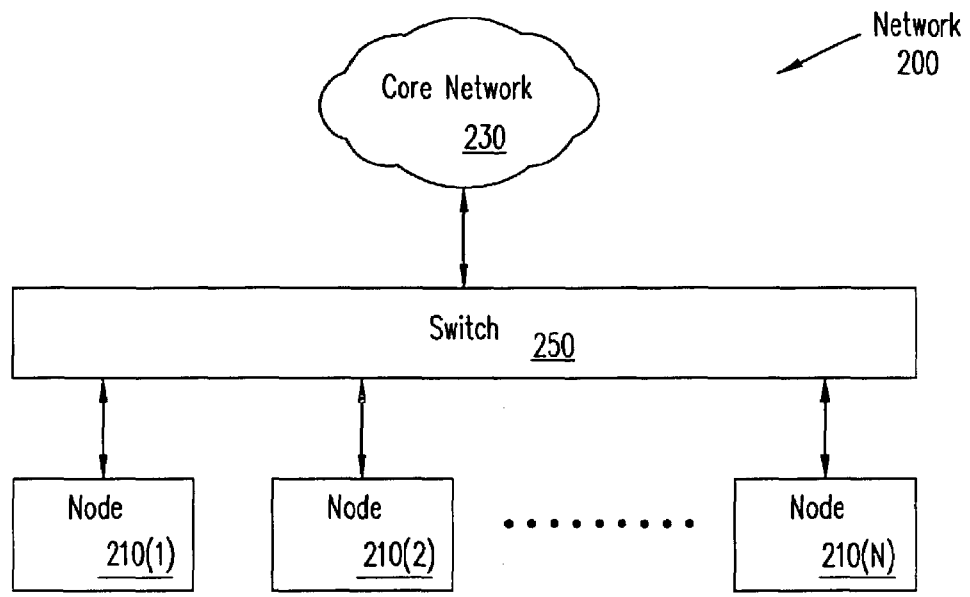
FIG. 2 is a block diagram illustrating a network according to the present invention.

The following is intended to provide a detailed description of an example of the invention and should not be taken to be limiting of the invention itself. Rather, any number of variations may fall within the scope of the invention which is defined in the claims following the description.

Introduction

Generic Bridge Protocol Data Unit (PDU) Tunneling (GBPT; also referred to herein as L2 Protocol Tunneling) enables service providers (e.g., of transparent local area network (LAN) services (TLS)) to have redundant links toward their customers. The tunneling of PDUs using GBPT also prevents the undesired interaction between the customers' networks and the service provider's network due to the direct exchange of protocol packets. For example, users have requested the ability to tunnel discovery protocol (DP) packets because the users want to avoid having to disable DP on their customer ports, while remaining transparent to their customers with respect to unwanted protocol traffic (e.g., DP).

A GBPT method according to the present invention operates properly regardless of whether or not IEEE 802.1Q tunneling is enabled, which is advantageous because there are applications that otherwise would not require IEEE 802.1Q tunneling (which can carry a number of customer VLANs across a number of service provider tunnels (and so, limiting the number of VLANs supported)). Some service providers offer their customers only one VLAN each, and so these service providers do not require IEEE 802.1Q tunneling because regular IEEE 802.1Q VLANs can be used instead.

One approach to bridged PDU (BPDU) tunneling according to the present invention is to software-encapsulate the PDUs in the ingress edge switches (for example of a TLS network) and then multicast the BPDUs in hardware through the tunnel (i.e., a service provider (SP) VLAN; the same VLAN also used to tunnel data). Egress edge switches de-encapsulate the tunneled packets and decide whether or not to forward them out of the tunnel. It should be noted that such protocol tunneling can be recursive: it is theoretically possible to have many layers of tunneling, each with their own distinctive encapsulation (e.g., using the media access control (MAC) address-based encapsulation described subsequently herein). However, it should be noted that encapsulation can also be performed in a number of other ways (e.g., by the microcode of a network processor or hardware based encapsulation, among other possible implementations).

The process of tunneling PDUs across a service provider's network using a method and apparatus of the present invention can be implemented as follows. A PDU with a customer network encapsulation arrives at a tunneling port and, because filtering indicates that the PDU is subject to GBPT processing (on the incoming-side, the packet's logical link control (LLC) sub-layer MAC address is matched), the PDU gets redirected to the inband port of the node's management processor (or, more simply, processor, as referred to elsewhere herein). It will be noted that, in fact, the functions described herein can also be performed by a general purpose processor, a network processor or the network element's hardware itself (e.g., line card hardware), among other such possibilities.

At the management processor, the PDU may arrive—at least from a logical point of view—double-encapsulated with an external encapsulation prepended to the customer network encapsulation (the customer internal encapsulation can be, for example, 802.1Q encapsulation or null encapsulation (depending on whether QinQ is used or not)). This is because, if enabled on an ingress port, QinQ simply adds an extra layer of encapsulation to any received packet, and, while QinQ does not add an extra tag, QinQ will not remove the tag present in the packet. It will be noted that a PDU's external encapsulation can assume different formats depending on where the PDU is inspected: within a switch the PDU will be in the internal backplane format, while outside the switch, the PDU will be in 802.1Q format, for example.

In order for the PDU to be multicasted, a multicast MAC address will typically be employed. This multicast MAC address can be, for example, a proprietary multicast MAC address not in the protocol's typical range of MAC addresses. This address is used by software to replace the original protocol MAC address (e.g., the IEEE STP MAC address (where STP stands for Spanning Tree Protocol)). This special GBPT MAC address can be programmed, for example, in the L2 forwarding table of the edge switches in order to enable interception and decapsulation of the tunneled PDUs at the exit points. The core switches do not have tunneling ports and therefore simply forward such packets transparently.

When a packet with a PDU MAC address is received on a tunneling port (entry point), the PDU is redirected to the MP. Here, the LLC sub-layer code dispatches the PDU to the GBPT process executing on the MP, which then determines whether or not to forward the PDU based on the LLC header and the user configuration (e.g., a setting of "tunnel DP on, tunnel STP off"). If tunneling for a given protocol is enabled, the process rewrites the destination address (DA) with the special GBPT MAC address, while keeping the other fields unaltered. The node then multicasts the PDU to the forwarding ports in the service provider network that are included in the tunneling VLAN (except for the source port). A specific output port mask can be used to optimize the process and avoid multiple copies of the packet being forwarded to each port. It should be noted that, when tunneled, the IEEE 802.1p class-of-service (CoS) bits of the PDUs may be rewritten appropriately, to get the best possible priority in the diffserv-enabled core switches. Command-line interface (CLI) commands are provided to configure the CoS bits of the tunneled PDUs.

On a receiving edge switch, a packet with the special GBPT MAC address is dispatched (as a result of a matching MAC address having been programmed in a filter (e.g., a MAC address match register)) to the GBPT process executing on that node's MP. The node's MP inspects the internal encapsulation and determines whether to forward a 802.1q-encapsulated or a null-encapsulated packet (again, this depends on whether or not QinQ is enabled). Based on the knowledge of the internal encapsulation format, the LLC header is retrieved from the packet and the protocol type read. Therefore, the special GBPT MAC address is overwritten with the original protocol MAC address and the packet forwarded out of the tunnel (if tunneling of the specific protocol is enabled on the exit point). It should be noted that described herein are "inbound" tunneling (i.e., the tunneling of customers' PDUs toward the service provider core), as well as "outbound" tunneling (i.e., the tunneling of service provider PDUs toward the customer network (e.g., for loop detection)).

An important advantage of GBPT is that such a feature enables a generic switch network (e.g., that of a TLS provider, with or without IEEE 802.1Q tunneling enabled) to be transparent to various L2 protocols. Other advantages of a GBPT technique according to the present invention include:

1. Improved redundancy for TLS networks;
2. Unification of customer site networks with respect to network discovery via DP;
3. Unified VLAN management of different customer sites; and
4. Creation of a barrier between the provider edge switches and the customer switches to prevent unwanted PDU interaction.

An Example of Network Element Operation and Architecture

FIG. 1A is a flow diagram illustrating a process for processing packets according to a generic bridge packet tunneling technique of the present invention. The process begins with the network element (e.g., a switch) awaiting the receipt of a packet (step 100). Once a packet has been received (step 100), the switch determines whether or not the packet thus received is a generic bridge packet tunneling (GBPT) packet (step 110). If the received packet is not a GBPT packet, the packet is transmitted across the network by the switch in the usual manner (step 120). However, if the packet is a GBPT packet, a copy of the packet is relayed to the other tunneling ports of the switch that belong to the same virtual local area network (VLAN) (step 130). This is followed by the encapsulation of the packet through the addition of GBPT information (step 140). Once the packet has been thus encapsulated, it is transmitted to the ports connected to the service provider core network (step 120). A packet can be identified as a GBPT packet, for example, using the packet's destination MAC address and the knowledge that certain protocol packets (identified by their MAC addresses) are to be tunneled, as is described in further detail subsequently.

FIG. 1B is a flow chart depicting a reception process according to embodiments of the present invention. The reception process begins with the receipt of a packet from the core of the service provider network (step 150). A determination is then made as to whether or not the received packet is a GBPT packet (step 160). If the packet received is not a GBPT packet, the packet is forwarded by the network element (e.g., switch) to other (non-tunneling) ports that are part of the VLAN indicated in the packet (step 170). However, if the packet received is a GBPT packet, the switch proceeds with decapsulation of the packet, stripping off the GBPT information. This results in a packet that appears as it did prior to its encapsulation (step 180). Once the packet has been decapsulated, the packet is transmitted to tunnel ports for the VLAN to which the packet belongs that are supported on the receiving switch (step 190). Then, as with other packets, the packet is passed on for further processing and/or forwarding to its destination (step 170). The process depicted in FIG. 1A should be referred to as a transmission process according to the present invention.

As noted, FIGS. 1A and 1B depict flow diagrams illustrating processes according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a general purpose processor (a central processing unit, or CPU), the micro-code of a network processor, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system.

The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits, and volatile storage media including registers, buffers or caches, main memory, RAM, and the like.

In a UNIX-based embodiment, the software modules may be embodied in a file which may be a device, a terminal, a local or remote file, a socket, a network connection, or other expedient of communication or state change. Other new and various types of computer-readable media may be used to store and/or transmit the software modules discussed herein.

FIG. 2 illustrates a network 200 according to embodiments of the present invention. Network 200 includes a number of user nodes (depicted in FIG. 2 as nodes 210(1)-(N)) coupled to an internet 230 via a switch 250. Switch 250 supports connectivity between nodes 210(1)-(N) and internet 230 by allowing information from one of the user nodes destined only for other user nodes to be switched through switch 250, but for information destined for nodes (e.g., in internet 230) to be routed through internet 230. Switch 250 supports processes according to embodiments of the present invention, so as to properly deal with GBPT packets, and so to support generic bridge packet tunneling (e.g., to perform the processes depicted in FIGS. 1A and 1B). Such a configuration requires additional hardware structures, as well as revised software, when compared to a conventional switch. It will be noted that, in a more general sense, the structures and process of the present invention can be included in other network elements (e.g., within a router included in internet 230) without loss of generality or applicability, as the functionality of such network elements may be combined. It will also be noted that, while the discussion herein is in terms of a switch (i.e., switch 250), this is merely an illustrative example—the present invention could be implemented in a hub or other environment.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
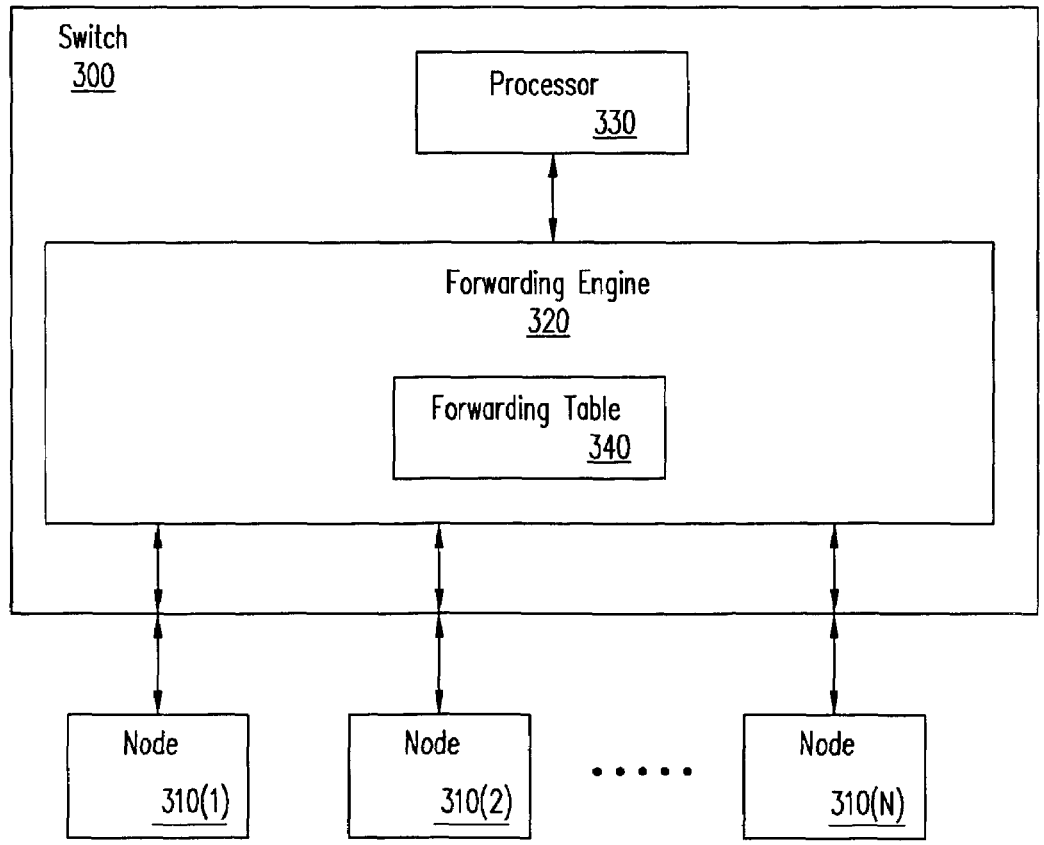
FIG. 3 is a block diagram illustrating a switch according to the present invention.

FIG. 3 is a block diagram depicting a switch 300 according to embodiments of the present invention. Switch 300 supports connections between a number of nodes (depicted in FIG. 3 as nodes 310(1)-(N)). Switch 300 includes a forwarding engine 320 that is communicatively coupled to a processor 330. Processor 330 includes configuration information (e.g., software, firmware or the like) that allows processor 330 to process GBPT packets. Forwarding engine 320 includes a forwarding table 340 which contains information used to identify packets (GBPT packets) that are destined for processing by processor 330.

Forwarding table 340 is a database of information used by switch 300 to make forwarding decisions by analysis of addressing information. Conceptually, forwarding table 340 is similar to a routing table. Software executing on switch 300 maintains forwarding table 340 which is, typically, stored in memory within switch 300 that allows fast access to this information (e.g., SRAM or cache memory). This can operate, for example, in the following manner. An IP address is provided, which may or may not exist in forwarding table 340. If the address exists in forwarding table 340 (and so the packet can be properly forwarded), that information is used to determine the outgoing port to which the traffic should be forwarded by accessing outgoing interface information that is stored in switch 300.

Forwarding engine 320, in the simplest terms, makes a determination as to which port(s) (and so node(s)) a packet will be forwarded (i.e., sent). Forwarding table 340 is used to determine the forwarding that is to be performed, including the forwarding of those packets identified as GBPT packets. Packets handled by switch 300 can take various paths—for example, such a packet may take a typical path (through forwarding engine 320) or a GBPT path (through forwarding engine 320 and processor 330) (neither path is shown specifically in FIG. 3). Processor 330 then performs the function of processing those packets identified by forwarding engine 320 as being subject to GBPT processing.

As is apparent, packets normally follow the first path, from a source user node (e.g., node 310(1)), through forwarding engine 320, to the intended destination user node (e.g., node 310(2)). These packets are the greater majority of the packets processed by switch 300, and so a process such as that depicted in FIGS. 1A and 1B, carried out by switch 300, has little impact on such traffic flow. However, packets that are identified as GBPT packets follow another path (the GBPT path), in which additional processing is performed by processor 330. In following this path, such packets are sent from a given node to other user nodes (e.g., the intended local user nodes), but are also intended for forwarding to other nodes across the network (e.g., internet 230) based on their intended destinations. Forwarding engine 320 passes such packets to processor 330 for processing, after which the now-processed packets are returned to forwarding engine 320 for forwarding on to their destinations based on their newly added information.

Figure 4:
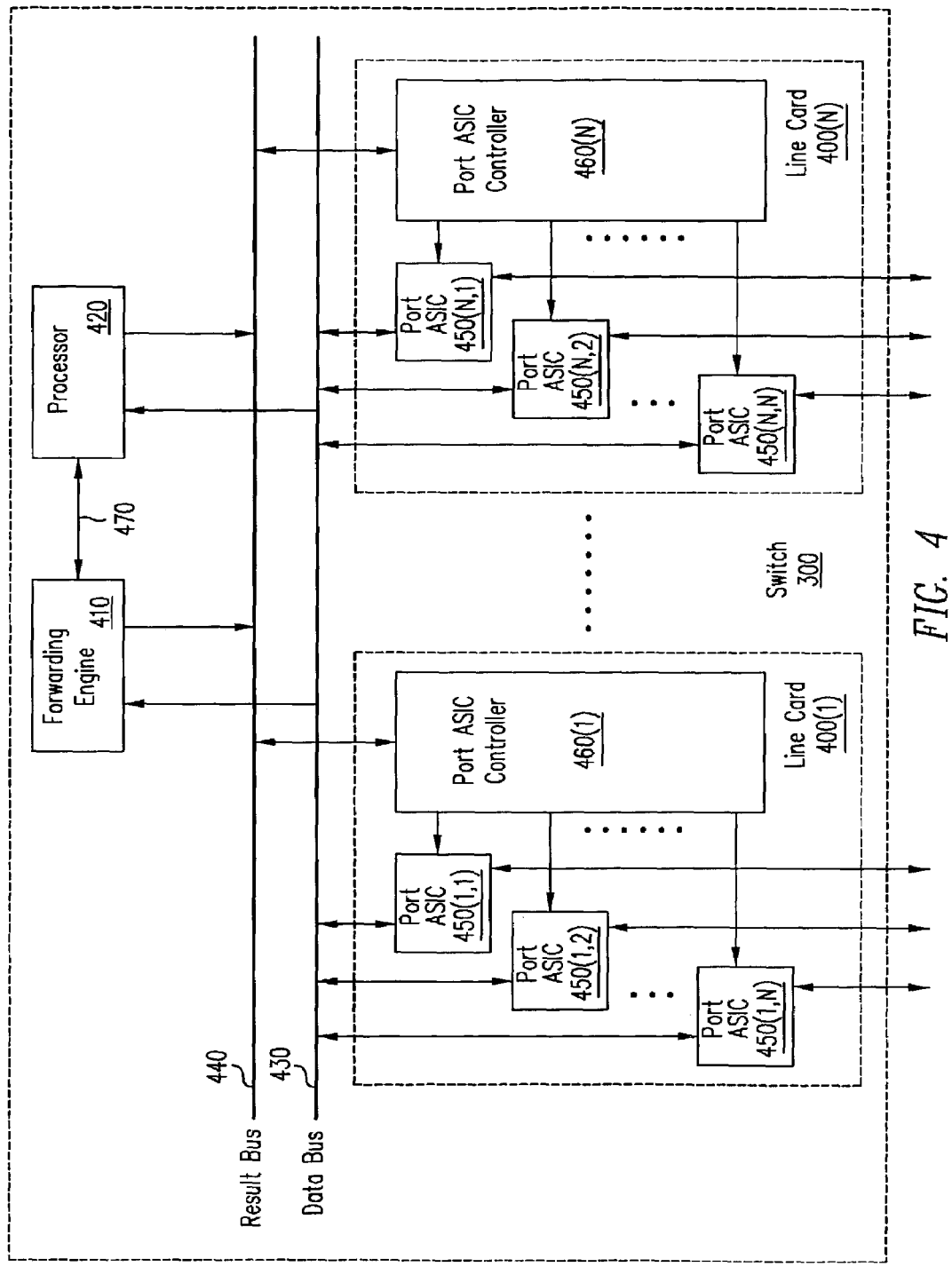
FIG. 4 is a block diagram illustrating a switch according to the present invention in greater detail.

FIG. 4 is a block diagram illustrating switch 300 in greater detail. In this depiction, switch 300 includes a number of line cards (line cards 500(1)-(N)) that are communicatively coupled to a forwarding engine 410 (exemplary of forwarding engine 320) and a processor 420 (exemplary of processor 330) via a data bus 430 and a result bus 440. Line cards 400(1)-(N) include a number of port ASICs 450(1,1)-(N,N) which are controlled by port ASIC controllers (depicted in FIG. 4 as port ASIC controllers 460(1)-(N)). It will also be noted that forwarding engine 410 and processor 420 not only coupled to one another via data bus 430 and result bus 440, but are also communicatively coupled to one another by a communications link 470.

As noted in connection with FIG. 3, while a non-GBPT packet is simply forwarded to its intended port, an GBPT packet is identified and analyzed, in a system according to the present invention. In terms of FIG. 4, upon receipt, a packet (of either type) is sent from the one of port ASICs 450(1,1)-(N,N) at which the packet was received to those devices coupled to data bus 430 (e.g., others of port ASICs 450(1,1)-(N,N) and forwarding engine 410). Forwarding engine 410 then makes a determination as to whether the given packet is a packet that is subject to the GBPT scheme implemented on switch 300 (e.g., one that is to be tunneled across internet 230). If such is not the case, the (non-GBPT) packet is forwarded by forwarding engine 410 to the intended one(s) of port ASICs 450(1,1)-(N,N) by indicating to corresponding one(s) of port ASIC controllers 460(1)-(N) that the copy of the packet held in the given one(s) of port ASICs 450(1,1)-(N,N) should be sent out on the corresponding port.

However, if the packet is subject to processing by the GBPT implementation, the packet is forwarded to processor 420 for such processing. Processor 420 processes the packet by, for example, adding GBPT information to the packet, that allows for its identification and proper forwarding within internet 230, as well as by network elements (e.g., switches) on the other side of internet 230. Typically, at least to some degree, this processing will be performed under software control, depending on how specialized processor 420 is architected, design decisions between hardware and software implementation, and the like. Once this processing is complete, processor 420 sends the now-processed (i.e., encapsulated) packet back to port ASICs on one or more of line cards 400(1)-(N). This is accomplished by processor 420 indicating to corresponding one(s) of port ASIC controllers 460(1)-(N) that the copy of the packet forwarded to one or more of port ASICs 450(1,1)-(N,N) should be sent out on the corresponding port(s).

Figure 5:
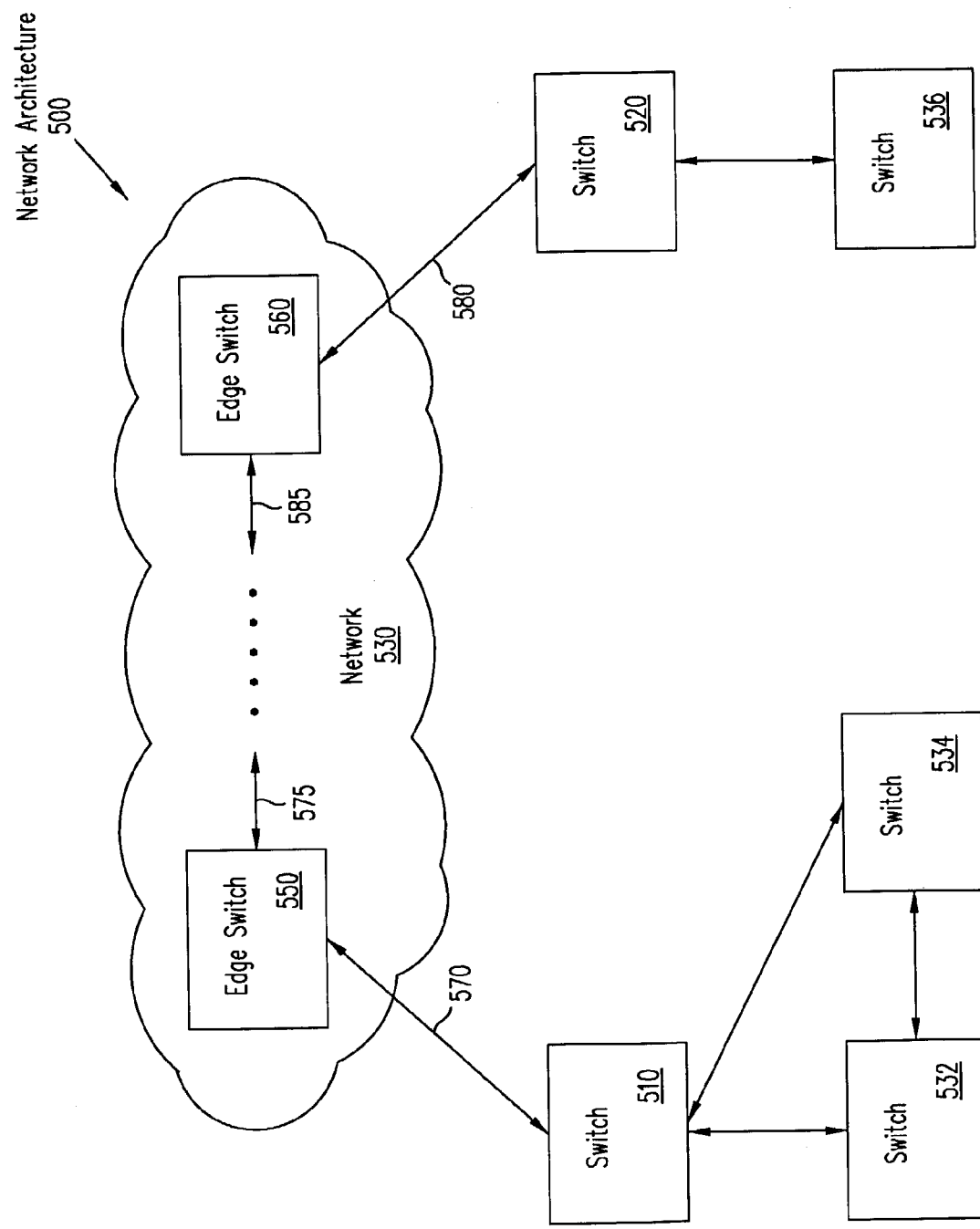
FIG. 5 is a block diagram illustrating a network configuration according to embodiments of the present invention.

FIG. 5 is a block diagram of a network architecture 500. Network architecture 500 includes a switch 510 and a switch 520 which communicate via a network 530. Network 530 can be, for example, a service provider network, which may employ protocols in support of a transparent local area network (LAN) service (TLS). Coupled to switch 510 and to one another, are switches 532 and 534, which a switch 536 is coupled to switch 520. Network 530 includes a number of switches, exemplified in FIG. 5 by edge switches 550 and 560. It will be understood that network 530 also includes switches that are not edge switches, but are, in fact, core switches. Edge switch 550 is coupled to switch 510 via a tunnel port 570, and to other switches in network 530 via a core port 575 (also referred to as a non-tunnel port). Similarly, edge switch 560 is coupled to switch 520 via a tunnel port 580, and to other switches within network 530 via a core port 585.

Switches 510, 532, 534, 520 and 536 in FIG. 5 are in the same VLAN, but are not aware of the means by which this connectivity is achieved in the network cloud (network 530). If network 530 does not tunnel PDUs of various protocols (e.g., spanning-tree protocol (STP), DP, VLAN trunking protocol (VTP) and the like), the two nodes involved will not be able to properly execute these protocols. For example, STP for a certain VLAN on switch 510 will build a spanning tree on the "left side" of the network (switches 510, 532 and 534) without considering convergence parameters based on the "right side" of the network (switches 520 and 536).

It is important to note the role of the network elements' various ports: specifically, there are tunneling ports (e.g., tunnel ports 570 and 580) and there are "trunks" (i.e., connections to the network; e.g., core ports 575 and 585). Tunneling ports act as ingress tunneling ports for traffic that is received on them and that needs to be encapsulated and forwarded to the network (per a process such as that depicted in FIG. 1A). These tunneling ports act as egress tunneling ports for traffic coming from the network that needs to be decapsulated and transmitted out of them (per a process such as that depicted in FIG. 1B).

Moreover, in both the receive and transmit paths (per processes such as those depicted in FIGS. 1A and 1B), in addition to the ingress/egress role of the ports with respect to the network, it is also important to note that on the same switch, traffic can also be relayed directly from one ingress tunneling port to one (or more) egress tunneling ports. This is logically equivalent to encapsulating the traffic from an ingress port and then immediately decapsulating the traffic to send that traffic out the egress port(s), all of which occurs within the same network element. This process occurs, for example, every time both ingress and egress ports are present on the same switch. It should also be noted that, in one embodiment, operation of the network element is governed by a rule that mandates that traffic received on a port cannot be sent back out of the same port, but can only be forwarded to ports different from the source. This rule applies to tunneling ports as well.

The following scheme can be implemented by the switches coupled to network 530, and is feasible and generic enough to support tunneling of, for example, STP BPDUs, as well as other types of PDUs.

1. Edge switches (those connected to the customer switch (i.e., switch 510 or 520 in FIG. 5)) perform the tunneling (e.g., encapsulation and sending, in software or microcode or hardware or the like); ports are configured as tunnel ports and PDUs received from such ports are:

Relayed to other tunnel ports; and

Encapsulated and sent to non-tunnel ports matching the PDUs' VLAN.

2. Core switches flood the tunneled packets through their forwarding ports in hardware (normally, core switches do not encapsulate PDUs).

3. An egress edge switch that receives the PDUs thus transferred:

1. Floods the PDUs to non-tunnel ports matching the PDUs' VLAN.

Decapsulate the PDUs and forward the decapsulated PDUs to tunnel ports.

4. Customer PDUs are encapsulated in the edge switch using, for example, a multicast address. The multicast address used is typically different from the DP class of addresses so that these packets do not go through the blocked ports. Some scheme (e.g., using a match register or system entry) is used by the edge switches to identify the special packets to be processed according to this invention.

5. It should be noted that, if the port is tunneling for any protocol, then the BPDUs of that particular protocol are not transmitted on that port, to avoid interaction between customer and service provider BPDUs.

Figure 6:
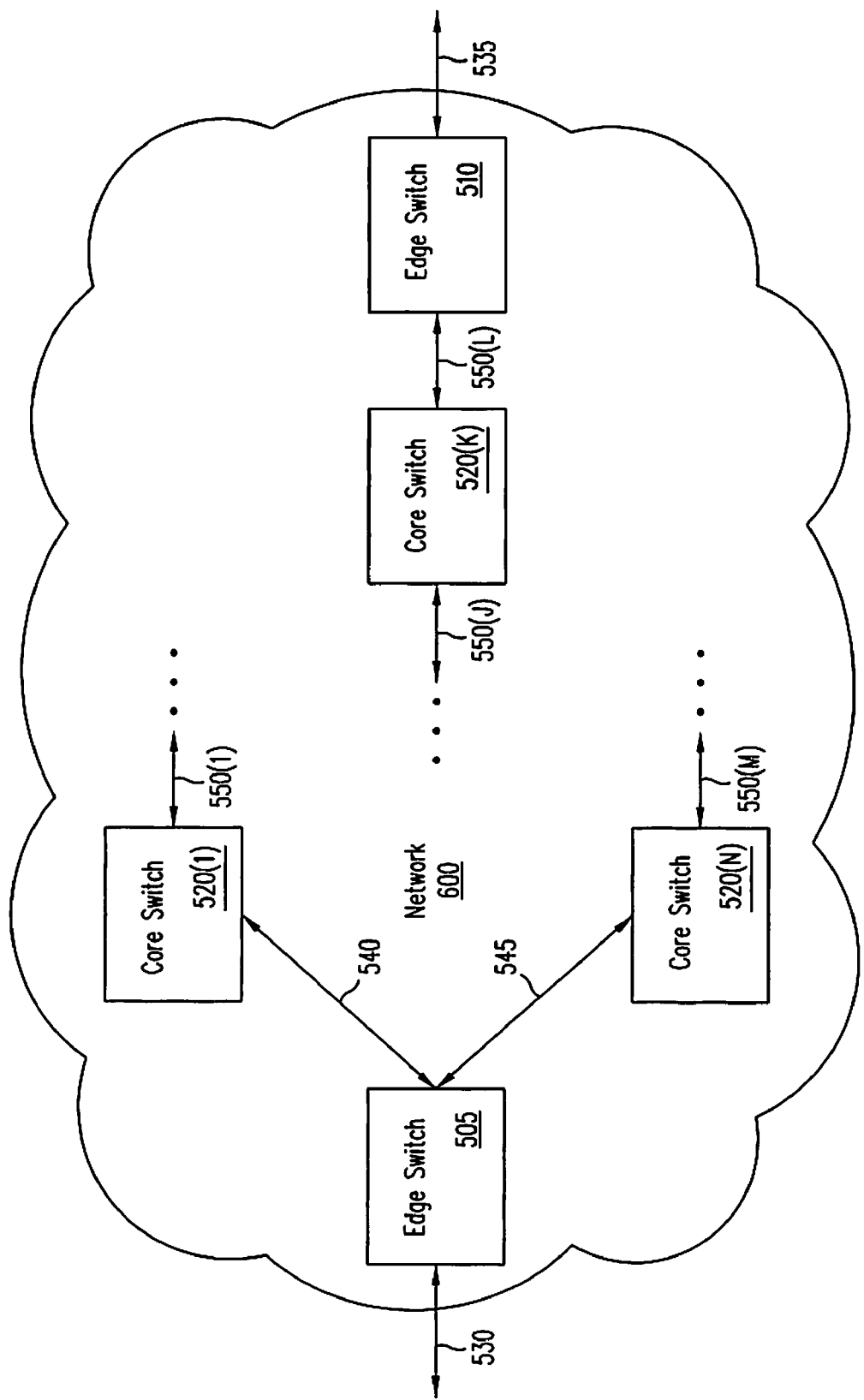
FIG. 6 is a block diagram illustrating a service provider network configuration according to embodiments of the present invention.

FIG. 6 is a block diagram illustrating a network such as network 530 in greater detail. As depicted in FIG. 6, a network 600 is shown to include a number of switches. The switches include edge switches 505 and 510, and a number of core switches (depicted in FIG. 6 as core switches 520(1)-(N)), one of which is a core switch 520(K)). Edge switch 505 is coupled to a user's switch (not shown) by a tunnel port 530. It will be noted that, as indicated, a port that is coupled between an edge switch and a user switch is referred to herein as a tunneling port. Similarly, edge switch 510 is coupled to a user's switch (not shown) by a tunnel port 535. Internal to network 600, the switches of network 600 are coupled to one another at one or more core ports. For example, edge switch 505 is coupled to core switch 520(1) by a core port 540, and to core switch 520(N) by a core port 545. In a similar fashion, core switches 520(1)-(N) are coupled to one another by core ports 550(1)-(M). For example, core switch 520(K) is coupled to another of core switches 520(1)-(N) by a core port 550(J), and to edge switch 510 via a core port 550(L).

The following scheme can be implemented by the switches coupled to network 530, and is feasible and generic enough to support tunneling of, for example, STP BPDUs, as well as other types of PDUs.
1. Edge switches (those connected to the customer switch (i.e., switch 510 or 520 in FIG. 5)) perform the tunneling (e.g., encapsulation and sending, in software); ports are configured as tunnel ports and PDUs received from such ports are:
   1. Relayed to other tunnel ports; and
   2. Encapsulated and sent to non-tunnel ports matching the PDUs' VLAN.
2. Core switches flood the tunneled packets through their forwarding ports in hardware (normally, core switches do not encapsulate PDUs).
3. An egress edge switch that receives the PDUs thus transferred:
   1. Floods the PDUs to non-tunnel ports matching the PDUs' VLAN.
   2. Decapsulate the PDUs and forward the decapsulated PDUs to tunnel ports.
4. Customer PDUs are encapsulated in the edge switch using, for example, a multicast address. The multicast address used is typically different from the DP class of addresses so that these packets do not go through the blocked ports. Some scheme (e.g., using a match register or system entry) is used by the edge switches to identify the special packets to be processed according to this invention.

Encapsulation and Decapsulation

If tunneling for a specified protocol is configured on an interface, the tunneling process substitutes the destination address with a particular multicast address and specifies the list of destination interfaces (e.g., furnished by STP for that VLAN). The following pseudo-code provides an example of such a procedure:

```
function filter_packet
{
   if (PDU received from tunnel_port)
   {
      if (enabled_prot AND matching pdu_type)
         encapsulate_and_SW_flood;
   }
   else /*not rcv'd from tunnel_port =>
   encapsulated PDU*/
      if (encapsulated_PDU)
         decapsulate_and_SW_flood;
}
function encapsulate_and_SW_flood
{
   relay PDU to tunnel_ports_in_vlan except
source;
   encapsPDU=build_Header(PDU);
   send encapsPDU to non_tunnel_ports_in_vlan;
}
function decapsulate_and_SW_flood
{
   send encapsPDU to ports_in_vlan except (source
and tunnel_ports_in_vlan);
   PDU=remove_Header(encapsPDU);
   send PDU to tunnel_ports_in_vlan;
}
```

Figures 7A, 7B:
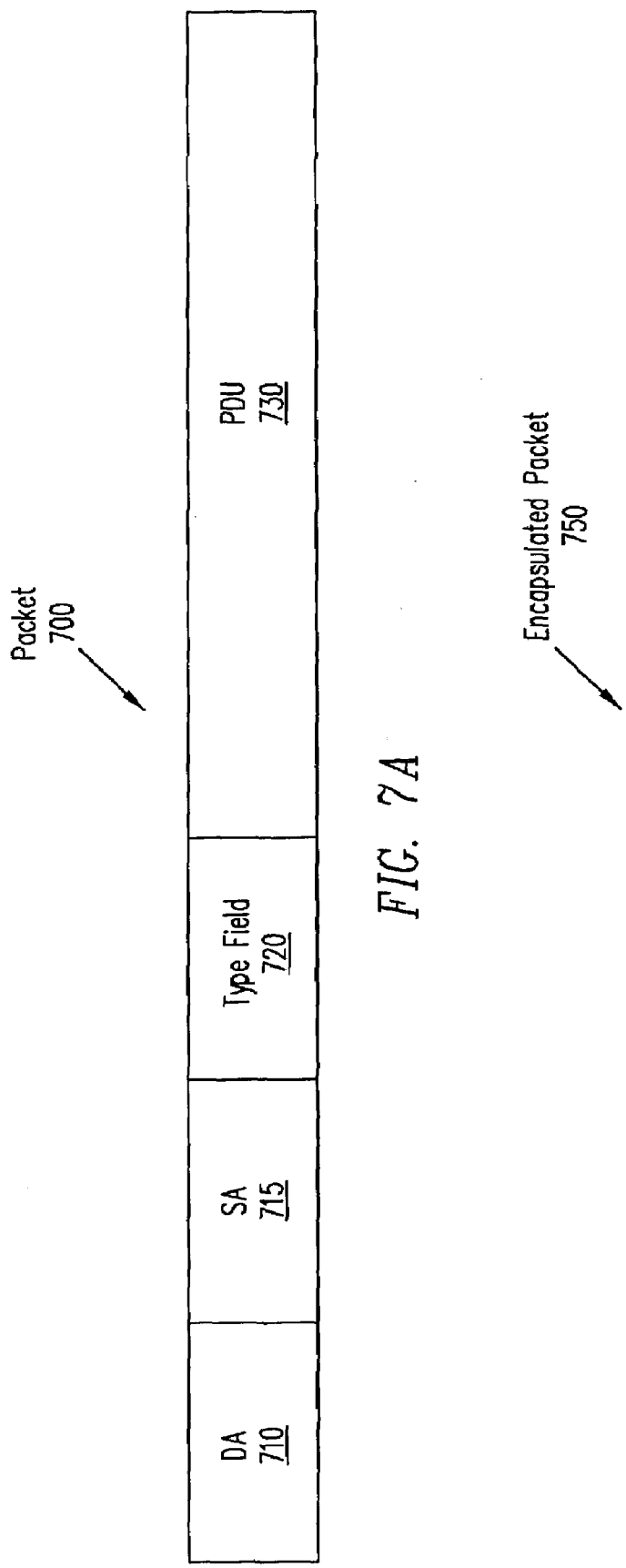
FIG. 7A is a block diagram illustrating an unprocessed packet according to embodiments of the present invention that includes firewall groups.
FIG. 7B is a block diagram illustrating a processed packet according to embodiments of the present invention that includes firewall groups.

FIGS. 7A and 7B are diagrams showing the layout of a packet before and after being encapsulated (and, conversely, after and before decapsulation, respectively), in the manner just described. FIG. 7A depicts a packet 700 prior to its encapsulation. Packet 700 includes a protocol destination address (the destination address inserted by the protocol in use, and depicted as a destination address 710), a source address 715, a type field 720 and a protocol data unit 730. FIG. 7B illustrates an encapsulated packet 750, which results from the encapsulation of packet 700. As before, encapsulated packet 750 includes source address 715, a type field 720 and a protocol data unit 730. However, instead of destination address 710, encapsulated packet 750 contains a multicast destination address 760. Multicast destination address 760 is, as its name implies, a multicast address indicating to which tunnel port or ports encapsulated packet 750 should be sent. It will be noted that encapsulated packet 750 can also be referred to as an encapsulated protocol data unit (PDU).

The GBPT core network encapsulation has the following variable format, and starts after the DA/SA pair (i.e., destination address 710 and source address 715), in type field 720. One alternative is a Length/Etype (which is not equal to 0x8100) and a data payload/LLC header. Another alternative is an Etype of 0x8100 and a 1q/1p tag, an Etype of 0x8100 and a 1q/1p tag, and a Length/Etype (equal to 0x8100) and a data payload/LLC header.

Example Implementation

Protocol tunneling can be implemented such that it interacts with packets implementing protocols such as DP, STP, VTP and Logical Link Control (LLC; a sub-layer of the data link layer), by the way of registry calls, for example. The processing of incoming packets is described below with regard to FIG. 8. PDUs incoming to the LLC sub-layer are first untagged by invoking a registry call to a "1Q-in-1Q" process (802.1Q encapsulation, or Q-in-Q, which is a solution that encapsulates a user's VLANs into a service provider's VLAN). The PDUs are then filtered and passed to the various protocols (DP/VTP/STP). The protocols then enqueue those PDUs that match the protocol to the protocol filtering. This encapsulates the PDUs and sends them back to the LLC sub-layer for forwarding via inband channels. Protocol tunneling obtains the list of interfaces matching the VLAN by the way of a registry call to, for example, the STP component.

Figure 8:
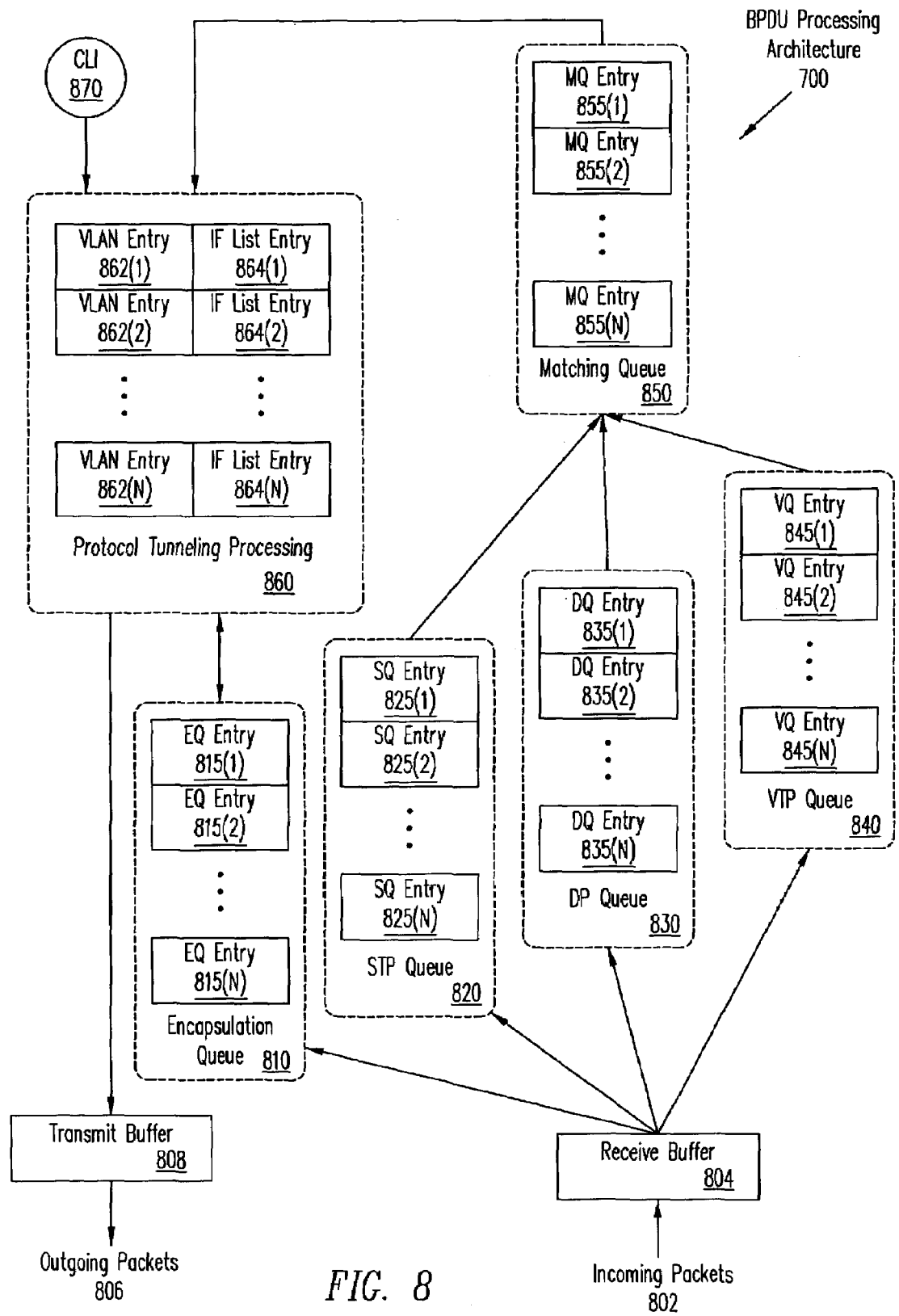
FIG. 8 is a block diagram illustrating a processing architecture for GBPT packets configured according to embodiments of the present invention.

FIG. 8 is a block diagram of a BPDU processing architecture 800 that is configured to process encapsulated packets such as that depicted in FIG. 7B. BPDU processing architecture 800 receives incoming packets 802 at a receive buffer 804 and transmits outgoing packets 806 at a transmit buffer 808. Receive buffer 804, after receiving incoming packets 802, sends these packets to one of a number of queues for processing. Such queues can include, for example, an encapsulation queue 810 (which includes a number of entries (depicted as EQ entries 815(1)-(N))), a spanning tree protocol (STP) queue 820 (which includes a number of entries (depicted as SQ entries 825(1)-(N))), a discovery protocol (DP) queue 830 (which includes a number of entries (depicted as DQ entries 835(1)-(N))) and a VLAN (virtual local area network) trunking protocol (VTP) queue 840 (which includes a number of entries (depicted as VQ entries 845(1)-(N))), among other such possible queues. Each of these queues is used for the storage of packets of a given protocol type (e.g., DP, STP, and VTP), while awaiting decapsulation.

As depicted in FIG. 8, STP queue 820, DP queue 830 and VTP queue 840 are coupled to a matching queue 850, which also includes a number of entries (depicted as MQ entries 855(1)-(N)), and provides temporary storage of packets (having (generically) been matched, and so subject to GBPT processing) until the packets can be processed. Matching queue 850 and encapsulation queue 810 are both coupled to a protocol tunneling processor 860 included in protocol tunneling processor 860 are a number of VLAN entries (depicted as VLAN entries 862(1)-(N) and a number of interface lists (depicted as interface list entries 864(1)-(N)). Matching queue 850 holds packets awaiting decapsulation by protocol tunneling processor 860, while encapsulation queue 810 holds packets awaiting encapsulation by protocol tunneling processor 860. Protocol tunneling processor 860 also provides a command line interface (depicted as command line interface 870, and discussed elsewhere herein). The packets output by protocol tunneling processor 860 are provided to transmit buffer 808 for transmission as outgoing packets 806.

In an edge switch, the operations are as follows:
1. Determine if the tunneling protocol interfaces match VLAN and filtering of PDUs. Typically, this is done in software, but preferably uses optimized data structures to maintain maximum throughput.
2. Encapsulation of PDUs, which is typically done in software or in microcode or in hardware.
3. Flooding of PDUs, which is typically done in software or in microcode or in hardware.
4. Decapsulation and sending on tunneling interfaces matching VLAN, which is typically done in software or in microcode or in hardware, and depends on the number of interfaces configured as tunneling on the given VLAN.

Figure 9:
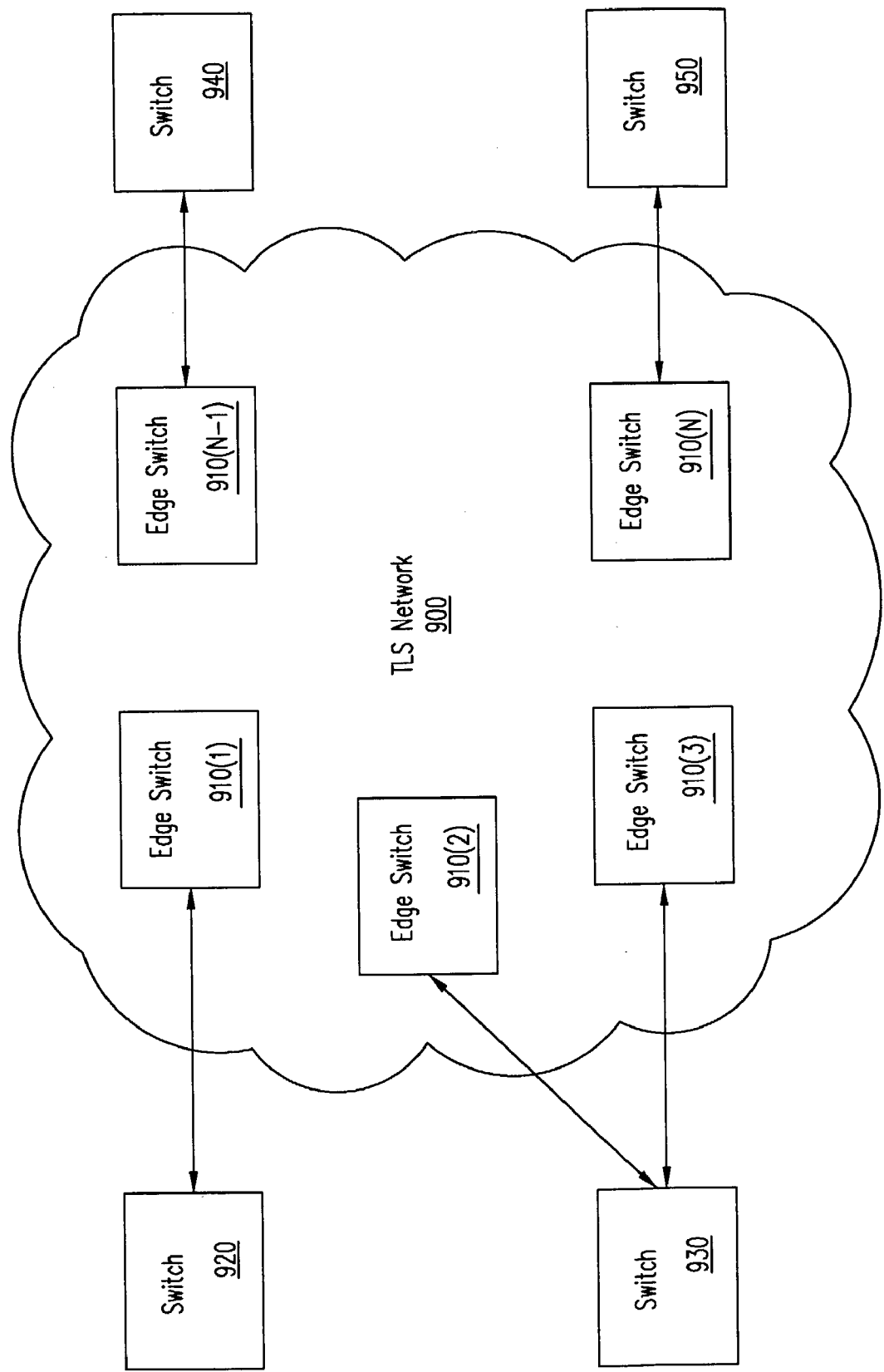
FIG. 9 is a block diagram illustrating a network architecture according to embodiments of the present invention.

FIG. 9 depicts a specific scenario in which bridge packet data units (BPDUs) are conveyed over a transparent land services (TLS) network 900. TLS network 900 includes a number of edge switches (depicted as edge switches 910(1)-(N)). Via edge switches 910(1)-(N), TLS network 900 is coupled to switches 920, 930, 940 and 950. As is shown, a switch may be connected to one or more edge switches (e.g., switch 930 is coupled both to edge switch 910(2) and 910(3)).

Switches 920, 930, 940 and 950 can be, for example, customer switches connected to TLS network 900 (e.g., a service provider "cloud") with an 802.1Q-compliant connection. The traffic originated from these switches can be tagged or untagged. Edge switches 910(1)-(N) are service provider switches that have at least one port connected to the customer switches (switches 920, 930, 940 and 950). The ports of edge switches 910(1)-(N) connected to customer switches are referred to herein as "tunneling ports", and can be entry or exit points. The other ports of the edge switches connected to the core network are referred to herein as "trunks" or "core ports". An edge switch is therefore a switch at the boundary between the service provider network and the customer network.

It should be noted that, in one embodiment, the 802.1Q tunneling that is used floods BPDUs only on the tunneling ports belonging to the same edge switch and supports only one level of tag nesting (1Q-in-1Q). It should also be noted that it is desirable to support the tunneling of any BPDU (i.e., for protocols such as 802.1D, SSTP (Shared STP), DP, VTP and other protocols) across different edge switches and to support multiple levels of tag imposition for both data traffic and BPDUs. It is also desirable that core network be able to run the IEEE 802.1w/1s protocols while performing BPDU tunneling.

As noted, a GBPT technique according to the present invention is a scalable approach to BPDU tunneling that allows software-encapsulation of PDUs in the ingress edge switches and their subsequent multicast in hardware through the tunnel. Egress edge switches then decapsulate the tunneled packets and decide whether or not to forward them out of the tunnel.

It will also be noted that, for purposes of the present discussion:
1. A tunneling port is an access port on the boundary of the service provider network on which a specific tunneled protocol can be encapsulated or decapsulated, and then forwarded in software. A tunneling port is typically configured through a specific and explicit GBPT command line interface (CLI) command.
2. A trunk port is a port connected to the core service provider network.
3. A tunneled PDU can be, for example, an STP BPDU, an SSTP PDU, a DP PDU, a VTP PDU or the like. In fact, any PDU can be supported.
4. Customer network encapsulation is the encapsulation that a customer device can use to forward traffic toward a tunneling port (it is assumed that this encapsulation complies with the relevant standard (e.g., IEEE 802.1q)). The null encapsulation reflects a normal IEEE 802.3 packet format.
5. Service provider network encapsulation is typically the outmost encapsulation added by a trunk port to a packet when relaying the traffic originating from the customer network.
6. Inbound tunneling is the tunneling process performed by an edge switch to create a data pipe starting from a trunk port and directed toward the core of the service provider network.
7. Outbound tunneling is the tunneling process performed by an edge switch to create a data pipe starting from a tunneling port and directed toward the core of the customer network.

The network architecture depicted in FIG. 9 operates as follows. A PDU with a customer network encapsulation arrives at a tunneling port and, since the PDU's MAC address is programmed in a special match register, the PDU is redirected to the inband port of the node's management processor MP. At the node's MP, the PDU typically arrives double-encapsulated with an external encapsulation prepended to the customer network encapsulation (the customer internal encapsulation is either the 802.1q or the null encapsulation depending on whether or not 802.1Q tunneling is being used). In order for the MP to multicast the PDU, a multicast MAC address is used. This multicast MAC address can be, for example, a proprietary multicast MAC address that is not in the DP/SSTP MAC address range. This address is typically used by software to replace the original protocol MAC address (e.g., the IEEE STP MAC address).

This special GBPT MAC address can be, for example, programmed in the L2 forwarding table of the edge switches in order to allow interception and decapsulation of the tunneled PDUs at the exit points. The core switches don't have tunneling ports, per se, and therefore simply forward the packet without redirecting the packet to the MP. For performance reasons, it may not be acceptable to alter the format of the packet during the software forwarding process. If this is the case, the GBPT encapsulation (i.e., the core network encapsulation) should match the original format in length and content. An example of such a layout is described in connection with FIGS. 7A and 7B. However, it is important to note that the layout described in connection with FIGS. 7A and 7B is merely an example. The chosen encapsulation format can vary in other implementations. In particular, a different encapsulation header format can be used to carry more information, if such additional information is needed for some reason. In the implementation described in connection with FIGS. 7A and 7B, the format is identical to that of the original to optimize performance. However, such an approach is not strictly required.

Thus, when a packet with a BPDU MAC address is received on a tunneling port (entry point), the PDU is redirected to the node's MP. Here, the LLC sub-layer code will dispatch the PDU to the GBPT process, which then determines whether to forward the PDU, based on the LLC header and the user configuration (e.g., a setting of "tunnel DP on, tunnel STP off"). If tunneling is enabled for the given protocol, the process rewrites the DA with the GBPT MAC address and, typically, leaves the PDU's other fields unaltered. The MP then causes the PDU to be multicasted to the forwarding ports (the tunneling ports (i.e., the tunnel exit points), as well as the trunk ports) of the tunneling VLAN (except for the source port). A specific output port mask can also be employed to optimize the process and avoid multiple copies of the packet to be forwarded in software to each port. Preferably, the class-of-service of the tunneled BPDUs is configured appropriately to get the best possible priority in diffserv-enabled core switches (e.g., similar to the special treatment the packets automatically receive in certain platforms when recognized as BPDUs). A CLI command can also be provided to configure the class-of-service of the tunneled PDUs.

On a receiving edge switch, a packet with the special GBPT MAC address is dispatched by the software at the LLC sublayer to the process that provides GBPT functionality. This GBPT process then inspects the internal encapsulation as described previously and decides whether to forward a 802.1Q encapsulated or a null-encapsulated packet. Based on the knowledge of the internal encapsulation format, the LLC header can be retrieved from the packet and the protocol type read. Therefore, the special GBPT MAC address can be overwritten with the original protocol MAC address and forwarded out of the tunnel, if tunneling of the specific protocol is enabled on the exit point.

A mechanism of protection of a tunneling port is also provided (e.g., packet drop or port shutdown or both) in case a customer network sends a number of PDUs/second that exceeds a specified user-configurable threshold. Furthermore, as a service provider network is to look like a hub for the customer data and control traffic (inbound tunneling), the customer's network should also be transparent to the service provider's BPDUs (outbound tunneling) (e.g., to prevent spanning tree loops from the perspective of the core network). Therefore, at the boundary between the customer network and the service provider network, an option can be provided to enable/disable the transmission of service provider BPDUs. These BPDUs can be useful in preventing external loops (STP) and DP point-to-point neighbor discovery across a customer network, for example.

In one embodiment, only IEEE STP BPDUs are deemed strictly necessary for outbound tunneling. DP PDUs instead are tunneled only in response to a user's request. Outbound tunneling includes the process of sending the regular service provider BPDUs sourced by a node's MP after rewriting them with the special GBPT MAC address, on all the tunneling ports of the edge switches. For example, if the customer network creates a loop between two tunneling ports in their native VLAN (e.g., due to a mis-configuration), then by exchanging tunneled STP BPDUs, one of the two ports can be shutdown as soon as the customer network's spanning tree converges and a loop is formed. For example, in FIG. 9, if the customer mis-configures switch 930 to carry untagged traffic on its trunk ports, then either edge switch 910(2) or 910(3) will shutdown its tunneling port. Preferably, a system log message is displayed when such a mis-configuration is discovered.

It should be noted that, in general, if a GBPT-encapsulated packet arrives from a trunk, that packet needs to be forwarded to all the other trunks, as well as be decapsulated on any tunnel exit points. Enhancements to the purely software-based forwarding process can be achieved by using techniques such as configuring special output port masks (hardware) or using particle-based DMA. An optimized software implementation reuses the same memory buffer for all the copies of the packet and just rewrite the header portion before sending each copy.

It should also be noted that, in order for multiple levels of tag nesting to be supported, more than one special GBPT MAC address is needed and in particular one new address per extra level of nesting is required. Alternatively, if only a single GBPT MAC address can be used for the entire network, then a multi-tiered hierarchy of edge switches can be instructed to properly handle in software all the received multi-encapsulated BPDUs. Typically, though, three levels of tag imposition are likely sufficient for most applications. Thus, just two levels of inbound tunneling might be ever necessary, and so, either one of the aforementioned alternatives is viable.

As noted, to get the best possible priority in the diffserv-enabled core switches, the IEEE 802.1p class-of-service (CoS) of the tunneled PDUs should be configured appropriately, similar to the special treatment the packets automatically get in some platforms when recognized as BPDUs. CLI commands are provided to configure the CoS of the tunneled PDUs.

Command Line Interface

An example command line interface (CLI) is as follows:

set port l2protocol-tunnel {mod/port} {cdp|stp|vtp} {enable|disable} set port l2protocol-tunnel mod/port drop-threshold {drop-threshold} shutdown-threshold {shutdown-threshold} set l2protocol-tunnel cos <cos-value> cos-value=0-7 show port l2protocol-tunnel [mod_num[/port_num]]

Configuring an Interface to Tunnel Protocols

This CLI enables/disables the protocol tunneling of an interface, specifying the type of protocol that has to be tunneled.

Router(config-if)# [no] protocol-tunnel [cdp|vtp|stp]

Router#conf t

Router(config)#int fe 4/1

Router(config-if)# protocol-tunnel cdp

Tunneling cannot be enabled on interfaces that have not "switchport" enabled

Router(config-if)# switchport

Router(config-if)# protocol-tunnel cdp cdp tunneling enabled on interface fastEthernet 4/1

Router(config-if)# protocol-tunnel stp cdp vtp tunneling enabled on interface fastEthernet 4/1

Router(config-if)# no protocol-tunnel

Protocol tunneling disabled on interface fastEthernet 4/1

Displaying Tunneled Protocols

This CLI displays the protocols tunneled on an interface or on the interfaces of a module Router>show int protocol-tunnel [mod|interface_type mod/port]

Router>show int protocol-tunnel fastEthernet 4/3

Port Tunneled protocol

-----+--------------------

4/3 cdp vtp stp

Router>show int protocol-tunnel 4

Port Tunneled protocol

-----+--------------------

4/1 cdp

4/2 stp

4/3 cdp vtp stp

4/4 -

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method for processing a packet comprising:
    identifying said packet as a generic bridge packet tunneling (GBPT) packet, using a forwarding engine, wherein said identifying comprises filtering said packet to determine whether said packet is said GBPT packet by comparing a portion of a header of said packet to a filter value stored in a match register of said forwarding engine; and said identifying uses a forwarding table of said forwarding engine to perform said identifying; and
    if said packet is identified as said GBPT packet,
    sending said packet to a protocol queue,
    sending said packet from said protocol queue to a matching queue,
    sending said packet from said matching queue to a protocol tunneling processing module, and
    causing said protocol tunneling processing module to perform GBPT processing on said packet, using a processor coupled to said forwarding engine.

2. The method of claim 1, wherein said comparing comprises: comparing said portion of said header of said packet to said filter value stored in an address match register.

3. The method of claim 1, wherein said comparing comprises: comparing said portion of said header of said packet to said filter value stored in a MAC address match register.

4. The method of claim 1, wherein said-packet is a packet of a protocol and said filtering further comprises:
    determining whether said protocol is designated in a user configuration as being subject to said GBPT processing.

5. The method of claim 1, wherein said GBPT processing comprises:
    performing transmit GBPT processing, if said packet is to be transmitted from a network node.

6. The method of claim 5, wherein said transmit GBPT processing comprises:
    encapsulating said packet.

7. The method of claim 6, wherein said encapsulating said packet comprises:
    overwriting a destination address in a header of said packet with a GBPT address.

8. The method of claim 1, wherein said identifying comprises:
    filtering said packet to determine whether said packet is a protocol packet, wherein said protocol packet is a packet of a protocol.

9. The method of claim 8, wherein said filtering comprises:
    determining whether said protocol is designated in a user configuration as being subject to said GBPT processing.

10. The method of claim 8, wherein said GBPT processing comprises:
    performing receive GBPT processing, if said packet has been received by a network node.

11. The method of claim 10, wherein said receive GBPT processing comprises:
    decapsulating said packet.

12. The method of claim 8, wherein said determining comprises:
    examining a media access control address of said packet.

13. The method of claim 1, wherein said GBPT processing comprises:
    performing receive GBPT processing, if said packet has been received by a network node.

14. The method of claim 13, wherein said receive GBPT processing comprises:
    decapsulating said packet.

15. The method of claim 6, wherein said encapsulating said packet comprises:
    overwriting a destination address in a header of said packet with a protocol destination address.

16. The method of claim 1, wherein said GBPT processing comprises:
    performing transmit GBPT processing, if said packet is to be transmitted from a network node.

17. The method of claim 16, wherein said transmit GBPT processing comprises:
    encapsulating said packet.

18. The method of claim 17, wherein said encapsulating said packet comprises:
    overwriting a destination address in a header of said packet with a GBPT address.

19. The method of claim 16, further comprising:
    encapsulating said packet, and
    forwarding said packet to a VLAN port of a network node, wherein
        said packet is received from a first network node,
        said VLAN port is coupled to a second network node, and
        a VLAN comprises said first and said second network nodes.

20. The method of claim 19, further comprising:
    forwarding said packet to a tunneling port of a network node, if said packet is a GBPT packet, wherein
        said packet is received from a first network node,
        said VLAN port is coupled to a second network node, and
        a VLAN comprises said first and said second network nodes.

21. The method of claim 1, further comprising:
    forwarding said packet to a VLAN port of a network node, wherein
        said packet is received from a first network node,
        said VLAN port is coupled to a second network node, and
        a VLAN comprises said first and said second network nodes.

22. The method of claim 21, further comprising:
    forwarding said packet to a tunneling port of a network node, if said packet is a GBPT packet, wherein
        said packet is received from a first network node,
        said VLAN port is coupled to a second network node, and
        a VLAN comprises said first and said second network nodes.

23. The method of claim 1, further comprising:
    forwarding said packet to a tunneling port of a network node, if said packet is a GBPT packet, wherein
        said packet is received from a first network node,
        a VLAN port is coupled to a second network node, a VLAN comprises said first and said second network nodes, and
said GBPT processing comprises
receive GBPT processing, and
transmit GBPT processing.
24. The method of claim 23, further comprising:
forwarding said packet to a VLAN port of said network node, wherein
said packet is received from a first network node,
said VLAN port is coupled to a second network node, and
a VLAN comprises said first and said second network nodes.
25. The method of claim 23, wherein
said receive GBPT processing comprises decapsulating said packet, and
said transmit GBPT processing comprises encapsulating said packet.
26. A network element comprising:
a forwarding engine, wherein
said forwarding engine stores a forwarding table, and
said forwarding engine is configured to identify a packet as a generic bridge packet tunneling (GBPT) packet using said forwarding table;
a processor, wherein
said forwarding engine is communicatively coupled to said processor,
said forwarding engine is configured to send said GBPT packet to said processor,
said processor is configured to support a protocol tunneling processing module, and
said processor is configured to process said packet, if said packet is identified as said GBPT packet; and
a Bridged Protocol Data Unit (BPDU) processing architecture, comprising:
a protocol tunneling processing module,
a protocol queue, communicatively coupled to said protocol tunneling processing module, and
a matching queue, communicatively coupled between said protocol queue and said protocol tunneling processing module.
27. The network element of claim 26, wherein
said processor is configured to perform GBPT processing on said packet, if said packet is a GBPT packet.
28. The network element of claim 27, wherein
said GBPT processing is receive GBPT processing.
29. The network element of claim 28, wherein said receive GBPT processing comprises:
decapsulating said packet.
30. The network element of claim 27, wherein
said GBPT processing is transmit GBPT processing.
31. The network element of claim 30, wherein said transmit GBPT processing comprises:
encapsulating said packet.
32. The network element of claim 26, further comprising:
a VLAN port; and
a tunneling port, wherein said VLAN port and said tunneling port are communicatively coupled to said processor.
33. The network element of claim 26, wherein said Bridged Protocol Data Unit (BPDU) processing architecture further comprises:
a plurality of protocol queues, wherein
said protocol queue is one of a plurality of said protocol queues, and
each of said protocol queues is communicatively coupled to said protocol tunneling processing module.
34. The network element of claim 33, wherein
said protocol queues comprise at least one of a discovery protocol queue, a spanning tree protocol queue, and a virtual local area network trunking protocol queue.
35. The network element of claim 26, wherein said BPDU processing architecture further comprises:
an encapsulation queue, communicatively coupled to said protocol tunneling processing module.
36. A network element comprising:
a network interface;
a processor, coupled to said network interface;
computer readable storage medium coupled to said processor; and
computer code, encoded in said computer readable storage medium, for processing a packet and configured to cause said processor to:
identify said packet as a generic bridge packet tunneling (GBPT) packet, wherein
said identifying comprises filtering said packet to determine whether said packet is said GBPT packet by comparing a portion of a header of said packet to a filter value stored in a match register, and
said identifying uses a forwarding table to perform said identifying; and
if said packet is identified as said GBPT packet,
send said packet to a protocol queue,
send said packet from said protocol queue to a matching queue,
send said packet from said matching queue to a protocol tunneling processing module, and
cause said protocol tunneling processing module to perform GBPT processing on said packet.
37. The network element of claim 36, wherein said computer code configured to cause said processor to identify is further configured to cause said processor to:
compare said portion of said header of said packet to said filter value stored in an address match register.
38. The network element of claim 37, wherein said computer code configured to cause said processor to compare is further configured to cause said processor to:
compare said portion of said header of said packet to said filter value stored in a MAC address match register.
39. The network element of claim 38, wherein said packet is a packet of a protocol and said computer code configured to cause said processor to filter is further configured to cause said processor to:
determine whether said protocol is designated in a user configuration as being subject to said GBPT processing.
40. The network element of claim 37, wherein said computer code configured to cause said processor to perform GBPT processing is further configured to cause said processor to:
perform transmit GBPT processing, if said packet is to be transmitted from said network element.
41. The network element of claim 40, wherein said computer code configured to cause said processor to perform said transmit GBPT processing is further configured to cause said processor to:
encapsulate said packet.
42. The network element of claim 41, wherein said computer code configured to cause said processor to encapsulate said packet is further configured to cause said processor to:
overwrite a destination address in a header of said packet with a GBPT address.
43. The network element of claim 36, wherein said computer code configured to cause said processor to identify is further configured to cause said processor to:

filter said packet to determine whether said packet is a protocol packet, wherein
said protocol packet is a packet of a protocol.

44. The network element of claim 43, wherein said computer code configured to cause said processor to filter is further configured to cause said processor to:
determine whether said protocol is designated in a user configuration as being subject to said GBPT processing.

45. The network element of claim 43, wherein said computer code configured to cause said processor to perform GBPT processing is further configured to cause said processor to:
perform receive GBPT processing, if said packet has been received by said network element.

46. The network element of claim 45, wherein said computer code configured to cause said processor to perform receive GBPT processing is further configured to cause said processor to:
decapsulate said packet.

47. The network element of claim 43, wherein said computer code configured to cause said processor to determine is further configured to cause said processor to:
examine a media access control address of said packet.

48. The network element of claim 36, wherein said computer code is further configured to cause said processor to:
forward said packet to a VLAN port of said network element, wherein
said packet is received from a first network node,
said VLAN port is coupled to a second network node, and
a VLAN comprises said first and said second network nodes.

49. The network element of claim 48, wherein said computer code is further configured to cause said processor to:
forward said packet to a tunneling port of said network element, if said packet is a GBPT packet, wherein
said packet is received from a first network node,
said VLAN port is coupled to a second network node, and
a VLAN comprises said first and said second network nodes.

50. The network element of claim 36, wherein said computer code is further configured to cause said processor to:
forward said packet to a tunneling port of said network element, if said packet is a GBPT packet, wherein
said packet is received from a first network node,
a VLAN port is coupled to a second network node,
a VLAN comprises said first and said second network nodes, and
said GBPT processing comprises
receive GBPT processing, and
transmit GBPT processing.

51. The network element of claim 50, wherein said computer code is further configured to cause said processor to:
forward said packet to a VLAN port of said network element, wherein
said packet is received from a first network node,
said VLAN port is coupled to a second network node, and
a VLAN comprises said first and said second network nodes.

52. The network element of claim 51, wherein
said computer code configured to cause said processor to perform said receive GBPT processing is further configured to cause said processor to decapsulate said packet, and
said computer code configured to cause said processor to perform said transmit GBPT processing is further configured to cause said processor to encapsulate said packet.

53. A computer readable storage medium having encoded thereon a computer program product comprising computer executable instructions for processing a packet, comprising:
a first set of instructions for identifying said packet as a generic bridge packet tunneling (GBPT) packet, wherein
said identifying comprises filtering said packet to determine whether said packet
is said GBPT packet by comparing a portion of a header of said packet to a filter value stored in a match register, and
said identifying uses a forwarding table to perform said identifying; and
a second set of instructions for, if said packet is identified as said GBPT packet,
sending said packet to a protocol queue,
sending said packet from said protocol queue to a matching queue,
sending said packet from said matching queue to a protocol tunneling processing module, and
causing said protocol tunneling processing module to perform GBPT processing on said packet.

54. The computer readable storage medium of claim 53, wherein said first set of instructions comprises:
a first subset of instructions for comparing said portion of said header of said packet to said filter value stored in an address match register.

55. The computer readable storage medium of claim 54, wherein said first subset of instructions comprises:
a first sub-subset of instructions for comparing a portion of a header of said packet to a filter value stored in a MAC address match register.

56. The computer readable storage medium of claim 55, wherein said packet is a packet of a protocol and said first subset of instructions comprises:
a second sub-subset of instructions for determining whether said protocol is designated in a user configuration as being subject to said GBPT processing.

57. The computer-readable storage medium of claim 54, wherein said second set of instructions comprises:
a first subset of instructions for performing transmit GBPT processing, if said packet is to be transmitted from a network node.

58. The computer readable storage medium of claim 57, wherein said first subset of instructions comprises:
a first sub-subset of instructions for encapsulating said packet.

59. The computer readable storage medium of claim 58, wherein said first sub-subset of instructions comprises:
a first sub-sub-subset of instructions for overwriting a destination address in a header of said packet with a GBPT address.

60. The computer readable storage medium of claim 53, wherein said first set of instructions comprises:
a first subset of instructions for filtering said packet to determine whether said packet is a protocol packet, wherein
said protocol packet is a packet of a protocol.

61. The computer readable storage medium of claim 60, wherein said first subset of instructions comprises:
a first sub-subset of instructions for determining whether said protocol is designated in a user configuration as being subject to said GBPT processing.

62. The computer readable storage medium of claim 60, wherein said second set of instructions comprises:
a first subset of instructions for performing receive GBPT processing, if said packet has been received by a network node.

63. The computer readable storage medium of claim 62, wherein said first subset of instructions comprises:
a first sub-subset of instructions for decapsulating said packet.

64. The computer readable storage medium of claim 60, wherein said first subset of instructions comprises:
a first sub-subset of instructions for examining a media access control address of said packet.

65. The computer readable storage medium of claim 53, further comprising:
a third set of instructions for forwarding said packet to a VLAN port of a network node, wherein
said packet is received from a first network node,
said VLAN port is coupled to a second network node, and
a VLAN comprises said first and said second network nodes.

66. The computer readable storage medium of claim 65, further comprising:
a fourth set of instructions for forwarding said packet to a tunneling port of a network node, if said packet is a GBPT packet, wherein
said packet is received from a first network node,
a VLAN port is coupled to a second network node, and
a VLAN comprises said first and said second network nodes.

67. The computer readable storage medium of claim 53, further comprising:
a third set of instructions for forwarding said packet to a tunneling port of a network node, if said packet is a GBPT packet, wherein
said packet is received from a first network node,
a VLAN port is coupled to a second network node,
a VLAN comprises said first and said second network nodes, and
said second set of instructions comprises
a first subset of instructions for performing receive GBPT processing, and
a second subset of instructions for transmitting GBPT processing.

68. The computer readable storage medium of claim 67, further comprising:
a fourth set of instructions for forwarding said packet to a VLAN port of a network node, wherein
said packet is received from a first network node,
said VLAN port is coupled to a second network node, and
a VLAN comprises said first and said second network nodes.

69. The computer readable storage medium of claim 68, wherein:
said first set of instructions comprises a first sub-subset of instructions for decapsulating said packet, and
said second set of instructions comprises a second sub-subset of instructions for encapsulating said packet.

70. An apparatus for processing a packet comprising:
means for identifying said packet as a generic bridge packet tunneling (GBPT) packet, wherein
said means for identifying comprises
a forwarding table,
a match register,
means for filtering said packet to determine whether said packet is said GBPT packet, said means for filtering comprising means for comparing a portion of a header of said packet to a filter value stored in said match register, and
said identifying uses said forwarding table to identify said packet as said GBPT packet;
a protocol queue;
means for sending said packet to said protocol queue;
a matching queue, coupled to said protocol queue;
means for sending said packet from said protocol queue to said matching queue;
a protocol tunneling processing module;
means for sending said packet from said matching queue to said protocol tunneling processing module; and
means for causing said protocol tunneling processing module to perform GBPT processing on said packet.

71. The apparatus of claim 70, wherein said means for comparing comprises: comparing said portion of said header of said packet to said filter value stored in an address match register.

72. The apparatus of claim 71, wherein said means for filtering comprises:
means for comparing a portion of a header of said packet to a filter value stored in a MAC address match register.

73. The apparatus of claim 72, wherein said packet is a packet of a protocol and said means for filtering further comprises:
means for determining whether said protocol is designated in a user configuration as being subject to said GBPT processing.

74. The apparatus of claim 71, wherein said means for GBPT processing comprises:
means for performing transmit GBPT processing, if said packet is to be transmitted from said apparatus.

75. The apparatus of claim 74, wherein said means for performing transmit GBPT processing comprises:
means for encapsulating said packet.

76. The apparatus of claim 75, wherein said means for encapsulating said packet comprises:
means for overwriting a destination address in a header of said packet with a GBPT address.

77. The apparatus of claim 70, wherein said means for identifying comprises:
means for filtering said packet to determine whether said packet is a protocol packet, wherein
said protocol packet is a packet of a protocol.

78. The apparatus of claim 77, wherein said means for filtering comprises:
means for determining whether said protocol is designated in a user configuration as being subject to said GBPT processing.

79. The apparatus of claim 77, wherein said means for GBPT processing comprises:
means for performing receive GBPT processing, if said packet has been received by said apparatus.

80. The apparatus of claim 79, wherein said means for performing receive GBPT processing comprises:
means for decapsulating said packet.

81. The apparatus of claim 77, wherein said means for determining comprises:
means for examining a media access control address of said packet.

82. The apparatus of claim 70, further comprising:
means for forwarding said packet to a VLAN port of said apparatus, wherein
said packet is received from a first network node, said VLAN port is coupled to a second network node, and a VLAN comprises said first and said second network nodes.

83. The apparatus of claim 82, further comprising:
means for forwarding said packet to a tunneling port of said apparatus, if said packet is a GBPT packet, wherein
said packet is received from a first network node,
said VLAN port is coupled to a second network node, and
a VLAN comprises said first and said second network nodes.

84. The apparatus of claim 70, further comprising:
means for forwarding said packet to a tunneling port of said apparatus, if said packet is a GBPT packet, wherein
said packet is received from a first network node,
a VLAN port is coupled to a second network node,
a VLAN comprises said first and said second network nodes, and
said means for GBPT processing comprises
means for receive GBPT processing and
means for transmit GBPT processing.

85. The apparatus of claim 84, further comprising:
means for forwarding said packet to a VLAN port of said apparatus, wherein
said packet is received from a first network node,
said VLAN port is coupled to a second network node, and
a VLAN comprises said first and said second network nodes.

86. The apparatus of claim 84, wherein
said means for receive GBPT processing comprises means for decapsulating said packet, and
said means for transmit GBPT processing comprises means for encapsulating said packet.

\* \* \* \* \*

UNITED STATES PATENT AND TRADEMARK OFFICE
CERTIFICATE OF CORRECTION

PATENT NO. : 7,606,229 B1  Page 1 of 1
APPLICATION NO. : 10/290906
DATED : October 20, 2009
INVENTOR(S) : Foschiano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1408 days.

Signed and Sealed this

Fourteenth Day of December, 2010

David J. Kappos
*Director of the United States Patent and Trademark Office*